3,006,962
PRODUCTION OF SULFOXIDES AND SULFONES
Herman S. Schultz, Saul R. Buc, and Harlan B. Freyermuth, all of Easton, Pa., assignors to General Aniline & Film Corporation, New York, N.Y., a corporation of Delaware
No Drawing. Filed Dec. 22, 1959, Ser. No. 861,215
16 Claims. (Cl. 260—607)

This invention relates to a method for producing sulfoxide- and sulfone-containing compounds, and more particularly to a process for the oxidation of organic compounds containing a sulfide linkage with hydrogen peroxide.

A number of oxidizing agents have been previously proposed and employed for the oxidation of organic sulfides to the corresponding sulfoxides and sulfones, including chlorine, sodium hypochlorite, sodium chlorate in HCl, and hydrogen peroxide alone or in glacial acetic acid, etc. Such processes have in general been plagued with a number of problems and disadvantages, including unduly long reaction times, unduly high reaction temperatures, unduly low yields, deterioration of the organic sulfide, contamination of the desired product by the by-products of oxidation, and undue loss of oxidizing agent during the reaction due to decomposition.

It is an object of this invention to provide a process for oxidizing an organic sulfide compound to the corresponding sulfoxide and/or sulfone compound which will not be subject to the above disadvantages. Another object of this invention is the provision of a process for producing sulfoxide- and sulfone-containing compounds by reaction of a compound containing at least one divalent sulfur atom bonded to two carbon atoms with hydrogen peroxide which will not be subject to the above disadvantages. Still another object of this invention is the provision of an improved process for producing sulfone-containing compounds by reaction of a compound containing at least one divalent sulfoxide group bonded to two carbon atoms with hydrogen peroxide. Other objects and advantages will appear as the description proceeds.

The attainment of the above objects is made possible by this invention which is based upon the discovery that vanadic, polyvanadic and peroxyvanadic acids and their alkali metal, alkaline earth metal, ammonium and amine salts constitute a group of highly effective catalysts for the oxidation of organic sulfides to the corresponding sulfoxides and/or sulfones and the oxidation of organic sulfoxides to the corresponding sulfones. The use of any of such vanadic acid compounds to catalyze the oxidation of organic sulfides and sulfoxides to the corresponding sulfoxides and sulfones has been unexpectedly found to enable the attainment of several advantages and improved results with respect to shortened reaction time, lower reaction temperatures, increased yields, decreased deterioration of the compound being oxidized, and/or decreased loss of hydrogen peroxide due to decomposition and the like.

The invention accordingly comprises a process for producing sulfoxide- and sulfone-containing compounds comprising reacting one mole of a compound containing at least one divalent sulfur atom bonded to two carbon atoms with from 1 to 2 moles of hydrogen peroxide for each such sulfur atom in said compound, at a pH of about 0.5 to 6 in the presence of a catalytic amount of a member of the group consisting of the vanadic, polyvanadic and peroxyvanadic acids and their alkali metal, alkaline earth metal, ammonium and amine salts.

The invention further comprises a process for producing sulfone-containing compounds comprising reacting one mole of a compound containing at least one divalent sulfoxide group bonded to two carbon atoms with one mole of hydrogen peroxide for each such group in said compound, at a pH of about 0.5 to 6 in the presence of a catalytic amount of a member of the group consisting of the vanadic, polyvanadic and peroxyvanadic acids and their alkali metal, alkaline earth metal, ammonium and amine salts.

As stated above, any organic compound containing at least one divalent sulfur atom or divalent sulfoxide group joined to two carbon atoms may be treated in accordance with the process of the present invention. Broadly speaking, such compounds may be described as thioethers or compounds containing a heterocyclic ring including a divalent sulfur atom bonded to two carbon atoms in the ring. Accordingly, the thioethers may be defined as having the structure R—S—R', and the hetero-S-containing compounds as having the same structure but in which R and R' represent, when joined together, the atoms necessary to form a cycle. As indicated, the sulfur atom in these compounds must be joined to a carbon atom in the R and R' moieties.

As representative of compounds containing a divalent sulfur atom as part of a heterocycle, there may be mentioned tetrahydrothiazine, thioxanthene, thioxanthone, tetrahydrothiophene derivatives and the like. The heterocyclic groups in these compounds may contain any organic or inorganic substituents and may be fused to any number of carbocyclic or heterocyclic rings which may be further substituted. As suitable substituents, there may be mentioned by way of example only, such groups as hydroxy, alkoxy, sulfoxy, sulfone, sulfonamide, nitrile, acyl and the like, in addition to inorganic groups including metals, etc.

As the organic sulfides or thioethers which may be oxidized in accordance with the present process, any compound of the above formula may be employed in which R and R' are organic radicals and are joined to the divalent sulfur atom through a carbon atom. The organic radical R or R' may be the same or different and may be aliphatic, aromatic, or heterocyclic, as for example radicals of heterocyclic compounds described in the preceding paragraph. R and R' may be alkyl, such as methyl and stearyl, aryl such as phenyl, naphthyl, anthraquinonyl, anthronyl, benzanthronyl, azine, azole, quinolinyl, pyridyl, pyrrol, thioxanthene, thioxanthone, thiophene, xanthene, xanthone, furane, and any other known moiety joined to the divalent sulfur atom through a carbon atom. Further, such R or R' moiety may be the monovalent radical, joined to the divalent sulfur atom through a carbon atom, of any known dyestuff or other functional agent. Further, R and R' may contain any desired organic or inorganic substituent or substituents of the type illustratively described above, and/or may be fused to any desired number of carbocyclic or heterocyclic rings.

It will be understood that the process of this invention is applicable for the oxidation to the sulfone stage of any of the sulfoxides corresponding to the above described compounds containing at least one divalent sulfur atom bonded to two carbon atoms.

In carrying out the reaction, it is preferred to employ an aqueous medium although in some instances a water miscible organic solvent for the starting intermediate may be employed as the reaction medium or as a mutual solvent in the aqueous medium for solubilizing purposes. As examples of such solvents, there may be mentioned methanol, ethanol, butanol, Cellosolves (lower alkyl and benzyl ethers of ethylene glycol), Carbitols (lower alkyl ethers of diethylene glycol), dioxane, acetone, methyl ethyl ketone, and the like. The reaction may be carried out at any temperature ranging from the freezing point to the boiling point of the medium although elevated temperatures of about 50° to 80° or 90° C. are preferred in most instances to accelerate the reaction. It is one of the advantages of this process that it may be carried out at lower temperatures than required in the absence of the present catalysts, and that even at the same temperatures, much shorter reaction times are made possible whereby deterioration of starting intermediate, oxidizing agent and the like is minimized.

The amount of hydrogen peroxide theoretically required to produce the sulfoxide or sulfone from the sulfide, or the sulfone from the sulfoxide, may be added at the start of the reaction or may be added gradually as the reaction proceeds. Starting with the sulfide, the reaction proceeds in two stages, in the first of which the sulfide is oxidized to the sulfoxide and in the second of which the sulfoxide is oxidized to the sulfone. The first stage of the reaction proceeds readily and is exothermic in nature whereby the temperature of the reaction medium rises without introduction of heat, in some instances to the boiling point. Cooling is often required to prevent the temperature from rising to a point detrimental to the reaction or to the chemical structure of the intermediate and final compound. The reaction medium may be homogeneous or heterogeneous, and in the form of a solution, dispersion or emulsion. The sulfoxide derivative is usually more soluble in water than either the sulfide or sulfone so that in many cases the sulfoxide is in solution in aqueous medium during the oxidation with hydrogen peroxide and may be isolated by cooling the aqueous solution or salting and/or extracting with appropriate solvents and/or separating layers and/or filtering off solid products.

One molecule of hydrogen peroxide theoretically is required to oxidize each said divalent sulfur atom in the starting compound to the corresponding sulfoxide, and another molecule of hydrogen peroxide required to oxidize the sulfoxide group to the sulfone. It is another advantage of this process that only substantially theoretical proportions are needed, although an excess of the hydrogen peroxide may be employed if so desired. This is made possible by the accelerated rate of reaction and/or lowered reaction temperatures necessary in the present process. The reaction medium should be maintained at a pH ranging from about 0.5 to 6 and preferably 1 to 3.

The oxidation of the sulfoxide to the sulfone is generally more difficult than the oxidation of the sulfide to the sulfoxide and may require more elevated temperatures and/or longer reaction times. In any case, the reaction to either the sulfoxide or the sulfone stage may be followed by testing for unreacted hydrogen peroxide with starch-iodide paper as the reaction proceeds. A negative testing indicates an absence of unreacted hydrogen peroxide indicating the reaction to be completed if the theoretical amount of hydrogen peroxide has been employed.

The hydrogen peroxide is preferably added in the form of the commercially available 30 to 31% aqueous solution although it may be added in any other form, e.g. from 5 to 100% concentration. To minimize loss due to decomposition of the hydrogen peroxide it is in some instances preferred to maintain the pH of the reaction medium in the neutral or acid range and/or to add the hydrogen peroxide at a rate about equal to its rate of consumption in the reaction. It will be understood that the process may be carried out by batch, intermittent or continuous methods. Any excess of hydrogen peroxide remaining after completion of the reaction may be removed by a brief reflux or by addition of a small, equivalent amount of sodium bisulfite.

The catalyst employed in the present process is a vanadic, polyvanadic or peroxyvanadic acid or a salt thereof, neutral or acid. Vanadic acid or sodium or ammonium vanadate are preferred, but any other vanadic acid compound or alkali metal, alkaline earth metal, ammonium or amine salt thereof may be employed. For example, as discussed in Sidgwick, "Chemical Elements and Their Compounds," Oxford University Press, 1950, vol. I, beginning at page 811, vanadic acid is known to form a series of highly condensed or polymerized acids of increasing complexity to which may be ascribed the formula $(V_2O_5)_n$. These acids and their hydrolyzed and/or acidified derivatives, in any of their ortho, meta, or other forms or structures, are operative herein, in addition to their peroxy forms resulting from treatment with hydrogen peroxide.

Salts of any of these vanadic acids with sodium, potassium, lithium, calcium, barium, magnesium, ammonium, mono-, di-, and tri-ethanol-, -propanol-, -methyl-, -ethyl-, and -propyl-amines, cyclohexylamine, morpholine, pyridine, picoline and the like may be employed. The catalyst may also be formed in the reaction medium by addition of vanadic oxide. The catalytic amount of such vanadic acid compounds required to achieve the desired results will in any particular instance be readily ascertainable by the person skilled in the art operating the process. In general, such amounts may range from about 0.001% to 10% by weight of the compound being oxidized, although amounts outside this range may be operative. Generally, 0.1 to 1% of the catalyst will be sufficient.

The mechanism by which the unexpectedly improved results of this process are obtained is not clearly understood although it is postulated, without of course being limited thereto, that the oxidation is actually effectuated by the action of the peroxyacid of the highest oxidation state of the vanadic acid which is continuously regenerated by the hydrogen peroxide.

As a further feature of this invention it has been found that further improved results are obtainable by inclusion in the reaction medium of a small amount of sequestering agent, for example from about 0.001 to 5% in the medium. This further improvement is based upon the discovery that small and even trace amounts of copper, chromium, iron and certain other metals catalyze the decomposition of hydrogen peroxide and/or other side reactions detrimental to the progress of the desired reaction. Such detrimental effects of these metal impurities is much more pronounced when the oxidations are carried out over an extended period of time such as 10 to 24 hours and/or at higher temperatures in the absence of the present catalytic substances. Although the use of these catalysts minimizes such undesirable decomposition and side reactions, optimum results in commercial use may in some instances be obtained by the addition of such sequestering agent. Ethylenediamine tetraacetic acid and other aminopolycarboxylic, and polyaminopolycarboxylic acids and then salts, preferably the alkali metal (sodium, potassium) salts, are preferred for use herein. However, these and other known sequestering agents for such metals may be used such as $\beta$-hydroxyethyl ethylene diamine triacetic acid, triethanolamine, citric acid, bis-N($\beta$-hydroxyethyl) glycine, gluconic acid, tartaric acid.

The usefulness of the improved process of this invention for carrying out oxidation of sulfide- and sulfoxide-containing organic compounds has been pointed out above. It will be understood that the products of such oxidation processes are suitable for a number of different known uses. In general, the sulfoxide and sulfone derivatives obtained by the present process are useful in a variety of applications such as dyestuff intermediates, dyestuffs, textile finishes, ultraviolet absorbers, photographic or photosensitive intermediates, water repellants, antibiotic substances, pharmaceuticals, polymer intermediates (monomers), and the like. By way of example, the process of this invention may be employed as a step in the production of compounds containing a sulfatoethylsulfone group as disclosed in U.S. Patent No. 2,670,265. Such compounds are reactive with fibrous materials acting to impart to the fibrous material any desired effect depending on the structure of the compound containing the sulfatoethylsulfone group. In this manner, improvements may be obtained in dyeing, crease-proofing, moth proofing, immunizing, water-proofing or water repellentizing, etc.

The following examples are only illustrative of the instant invention and are not to be regarded as limitative. All parts and proportions referred to herein and in the appended claims are by weight unless otherwise indicated.

*Example 1*

0.2 part of ammonium metavanadate is dissolved in 75 parts water, the resulting solution having a pH of about 11.5. The pH is lowered to about 2.0 by the addition of sulfuric acid. 31.7 parts of 5-nitro-2-methyl-m-xylylene-$\alpha^1,\alpha^3$-bis(mercaptoethanol) are added to the catalyst solution and the mixture heated to 60–65° C. 21.9 parts 31% hydrogen peroxide are added gradually over a one-half hour period. The temperature is maintained at 60–65° C. by cooling with a cold water bath. The suspension of bis-sulfide goes into solution as it is oxidized to the bis-sulfoxide, and at the end of the addition of peroxide a homogeneous system exists. After five minutes stirring the reaction mixture gives a negative hydrogen peroxide test on starch-potassium iodide paper. The temperature of the reaction mixture is raised to 65–70° C. and 24.1 parts 31% hydrogen peroxide are gradually added during a one-half hour period and the temperature maintained at 70–75° C. During the addition of the second portion of peroxide, the bis-sulfone is formed and precipitates out. The reaction mixture is refluxed for one-half hour, then cooled to room temperature. The product is filtered, washed with water and dried in a vacuum oven at 85° C. The 5-nitro-2-methyl-m-xylylene-$\alpha^1,\alpha^3$-bis(sulfonylethanol) product, melting at 193–194° C., is obtained in an 87% yield. The product has the following structure:

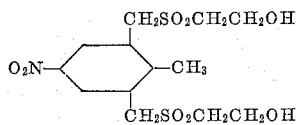

The bis-mercaptoethanol intermediate subjected to oxidation in this example is prepared by bis-chloromethylation of p-nitro toluene and reaction of the bis-chloromethylated compound with mercaptoethanol.

*Example 2*

(For comparison, without catalyst)

31.7 parts 5-nitro-2-methyl-m-xylylene-$\alpha^1,\alpha^3$-bis(mercaptoethanol)=0.10 moles are added to 75 parts of water of pH 6.0 and the mixture heated to 60° C. There is then added in 32 minutes, 20.6 parts per volume of 30% hydrogen peroxide. After 13.5 parts per volume have been added the mixture is a clear solution. The solution is heated to reflux and there is then added in 10 minutes, 23.2 parts per volume of 30% hydrogen peroxide. The solution becomes lighter. A positive test for hydrogen peroxide stays after 3 hours at reflux. Let cool and stand overnight. Filter and wash with a little ice water. Yield=21.60 g. dry product=56.6% theory, M.P.=168–170° C. The product has the same structure as that of Example 1.

*Example 3*

The procedure of Example 1 is repeated except that 12 parts of tetrasodium ethylenediamine tetraacetate solution (.0375 g./ml.) are added to the catalyst solution. The same product is obtained in 88% yield.

*Example 4*

The procedure of Example 1 is repeated except that 10 parts tetrasodium ethylenediamine tetraacetate solution (.0375 g./ml.) and 24.3 parts 2-(2-nitro-o-anisyl-$\alpha^1$-mercapto) ethanol are added to the catalyst solution instead of the bis(mercaptoethanol). The product has a melting point of 130–132° C. obtained in 88% yield. Its structure is:

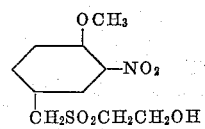

The mercaptoethanol intermediate subjected to oxidation in this example is prepared by monochloromethylation of o-nitroanisole and reaction of the chloromethylated compound with mercaptoethanol.

*Example 5*

The procedure of Example 1 is repeated except that 10 parts tetrasodium ethylene diamine tetraacetate solution (.0375 g./ml.) and 24.3 parts 2-(4-nitro-o-anisyl-$\alpha^1$-mercapto) ethanol are added to the catalyst solution instead of the bis(mercaptoethanol). The product has the structure:

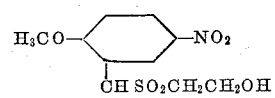

*Example 6*

A catalyst solution is prepared by dissolving 0.2 g. (0.0017 mole) sodium orthovanadate ($Na_3VO_4$) in 65 cc. distilled water. Solution takes place immediately to give a pH of 12.5. The pH of the solution is reduced to 1.8 by the addition of a small amount of dilute sulfuric acid. This solution is charged to a reactor with 30.8 g. (0.2 mole) of 2-phenylmercaptoethanol.

31% hydrogen peroxide is added to the rapidly stirred solution heated to 67° C. An immediate exotherm results. Some intermittent cooling is needed and the temperature is in the 64–73° C. range in the fifteen minute interval to the point when the solution becomes clear and homogeneous. This occurs when 16.2 cc. hydrogen peroxide have been added. After this point (essentially the sulfide to sulfoxide state) it is necessary to apply heat intermittently. Temperature is maintained spontaneously after the clearing point (68–78° C.) for periods where a relatively large amount of hydrogen peroxide is present in solution. This shows some exothermic characteristics in the second stage. A total of 39 cc. hydrogen peroxide gives a negative starch-iodide test in a total of 1½ hours, in the above temperature range. Another hour and five minutes and 6 cc. more hydrogen peroxide and heat are used to make certain the reaction is finished. The pH at the end of the reaction is 1.3 and excess hydrogen peroxide is removed by reaction with a small amount of sodium bisulfite. The salted solution is extracted several times with benzene, the benzene dried and stripped and the product then distilled through a simple take-off head. The product is 2-phenylsulfonylethanol, confirmed in structure by infrared spectra, in 85% yield, $n_D^{25}$ 1.5564–1.5570. During the course of the oxidation, transient colors appear which are characteristic of peroxyvanadic and peroxyvanadyl salts as described on page 814 of the above cited Sidgwick reference.

*Example 7*

(For comparison, without catalyst)

This example deals with the oxidation of 2-phenylmercapto ethanol to mainly 2-phenylsulfinyl ethanol when no catalyst is used under conditions similar to Example 6.

The same amount of 2-phenylmercaptoethanol as in Example 6 in 65 cc. distilled water is charged to a stirred reactor and the reactor heated to 65° C. No obvious heat requiring cooling is given off on addition of hydrogen peroxide. Heating is required to maintain a temperature range of 65–70° C. 70 minutes are required to give a clear homogeneous solution after the addition of a total of 19 cc. 31% hydrogen peroxide in several por-